H. W. JACOBS.
MEANS FOR FORMING JOINTS.
APPLICATION FILED JAN. 24, 1911.
998,904.
Patented July 25, 1911.
2 SHEETS—SHEET 1.
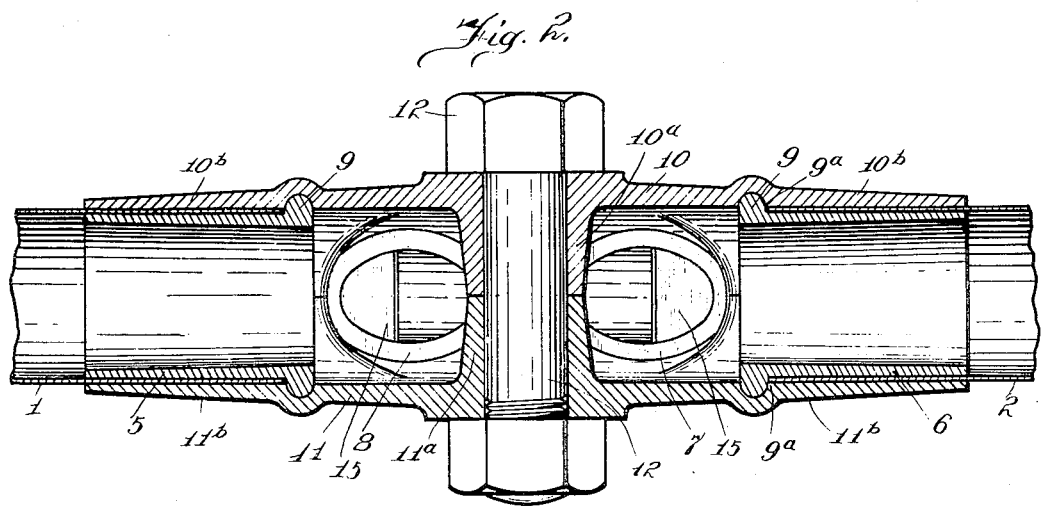
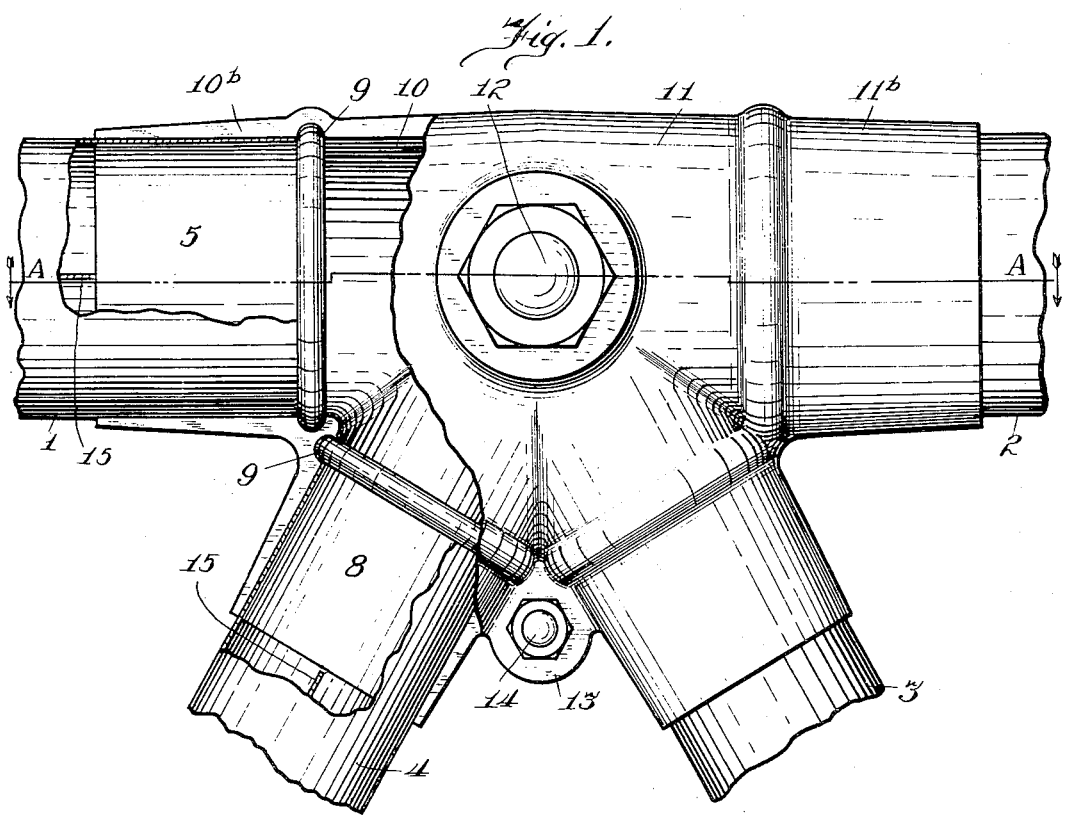
Witnesses
P. E. Wighton
Milton Lenoir
Inventor
Henry H. Jacobs
By Heidman Strak
Attorneys

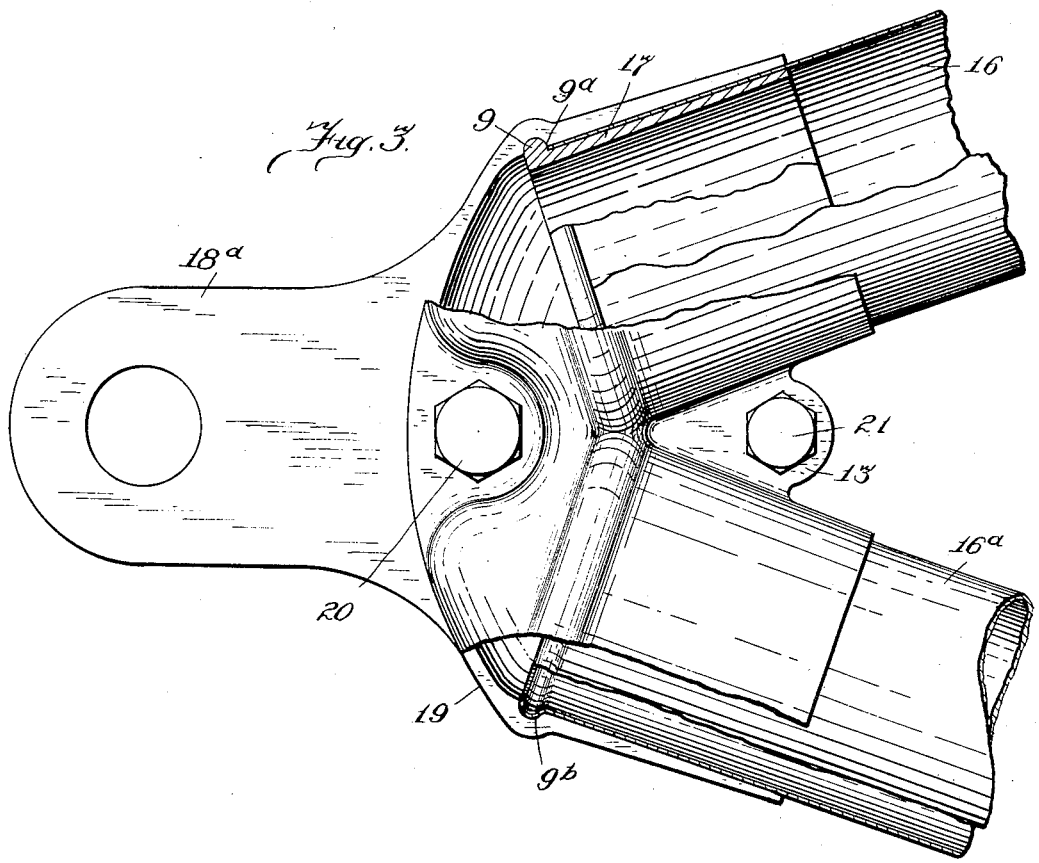
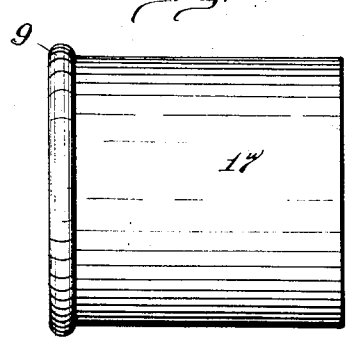
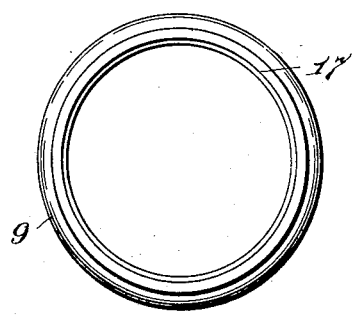

UNITED STATES PATENT OFFICE.

HENRY W. JACOBS, OF TOPEKA, KANSAS.

MEANS FOR FORMING JOINTS.

998,904. Specification of Letters Patent. Patented July 25, 1911.

Application filed January 24, 1911. Serial No. 604,373.

*To all whom it may concern:*

Be it known that I, HENRY W. JACOBS, a citizen of the United States, and resident of Topeka, in the county of Shawnee and State of Kansas, have invented a certain new and useful Improvement in Means for Forming Joints, of which the following is a description, reference being had to the accompanying drawings, which form a part of my specification.

My invention relates to means for forming a strong but light connection for tubing, spars, beams, and the like, whereby the splices or other methods of joining the parts together will be made secure, and the tubing, spars, beams, and the like, will be securely held in proper alinement or relation.

The object of my invention is to provide means which may be easily and quickly assembled and taken apart, so that the desired relation of the parts or frame members, to be secured together by said means, may be readily brought about and the same as quickly disarranged or disjointed.

A further object of my invention is to provide a joint or connection for tubing or spars, particularly such as are used in the construction of aerial craft, automobiles, bicycles, motor cycles, and the like, which will obviate the necessity for the use of nails, screws, rivets, or bolts passing through or taking into the tubing, spars, or frame-members that are secured together by my improved means, as will more fully appear from the following detailed description.

In the drawings:—Figure 1 is a plan view of one form of my improved means, somewhat in the nature of a rosette connection, whereby four separate members or tubes are shown connected up in a selected manner; a part of the means being broken away, with a portion of the tubes shown in section, in order to more clearly illustrate the internal construction of the joint. Fig. 2 is a cross sectional view taken on the line *a—a* of Fig. 1 looking in the direction of the arrows. Fig. 3 is a plan view of a modified form of my invention in which the ends of two truss frame-members are shown with a portion of the frame members and ferrule shown in section, and a portion of the means broken away. Fig. 4 is a plan view of a ferrule, which may be employed in forming a connection between tubular frame-members as illustrated in Fig. 2. Fig. 5 is an end view of the ferrule illustrated in Fig. 4.

I have illustrated two forms of my invention for forming joints of a different character, but it can readily be seen that a number of combinations or connections may be made differing materially from those illustrated.

My invention is especially adapted for use in connection with aerial constructions, as it obviates the necessity for screws, bolts, and the like, taking into the frame members, as is usual with methods heretofore employed, which would tend to weaken the respective members perforated thereby.

In Figs. 1 and 2, I have shown tubing 1, 2, 3, and 4, provided with ferrules 5, 6, 7, and 8, preferably inserted within the ends of the tubing and secured in place in any suitable manner, as for example, by brazing, soldering, riveting or otherwise. The outer ends of the ferrules are provided with the semi-circular flange or rib 9. Connecting or clamping members 10 and 11, having corresponding faces, are each provided with the abutting portion or hub $10^a$ and $11^a$, through which the bolt 12 is adapted to pass. The members 10 and 11 are provided with the radiating portions or ramifications $10^b$ and $11^b$, extending outward from the abutting or hub portions $10^a$ and $11^a$ in a predetermined manner to adapt the clamping members to the connection or joint it is desired to make; that is, the portions $10^b$ and $11^b$ are formed to extend from the intermediate or abutting portions $10^a$ and $11^a$ in the direction that the respective members, it is intended to clamp together, extend. The members or portions $10^b$ and $11^b$, in the examples illustrated in Figs. 1 and 2, are formed semi-circular in cross section, in order to have them conform with the shape of the tubular frame-members it is intended to join together; each radiating arm, or member $10^b$ and $11^b$, is preferably provided with a groove on its inner face to receive the semi-circular flange or rib 9, or a transversely extending shoulder or rib as at $9^a$, to take against the rib 9, of the ferrules, thereby preventing the longitudinal or outward movement of the members in the respective bifurcations or arms of the members 10 and 11, as is clearly evident from the construction illustrated. Where a number of portions $10^b$ and $11^b$ are used, I prefer to provide an intermediate web portion 13, through which an additional clamping bolt 14 may pass, whereby the respective members are more firmly secured or clamped together after the bolt 12 has been firmly set. By forming the arms or portions 10<sup>b</sup> and 11<sup>b</sup> of considerable length, it will be seen that long sockets are thereby provided for the ends of the respective members, it is intended to clamp together, thus enabling the respective frame members to be rigidly secured and held in perfect alinement or relation.

It is apparent from the construction shown and described that very rigid and effective joints can be obtained which may at the same time be readily disconnected or broken by simply removing bolts 12 and 14, thereby permitting the frame-members or structure to be easily and quickly taken apart.

The tubular frame-members 1, 2, 3, and 4, shown in Figs. 1 and 2, have been shown of elliptical or theta shape, provided with a reinforcing web for bridge 15, extending through the short axis as clearly shown, whereby the tubular members are greatly reinforced.

In Fig. 3, I have illustrated another form of my means for forming a joint or connection, adapted for use in connection with circular tubing or frame-members 16 and 16<sup>a</sup>. The one frame-member 16 is shown provided with a ferrule 17, having the semicircular flange 9 similar to the ferrules heretofore referred to in connection with Figs. 1 and 2; the flange 9 on the ferrule taking into the semi-circular groove or against the rib or shoulder 9<sup>a</sup> on the inner faces of both clamping members 18 and 19. The tubular member 16<sup>a</sup> is shown without a ferrule, but instead, the end of the tube is swaged or shaped so as to provide the rib portion 9<sup>b</sup>, which is shown semi-circular in shape, and which is adapted to take into the semi-circular grooves preferably formed in the clamping members 18 and 19. By thus forming the end of the tubular members, it is evident that the use of a ferrule is obviated. The semi-circular grooves or shoulders in the respective clamping members are made identical, however, whether a ferrule is used or an integral flange or rib portion is provided on the frame-members.

In Fig. 3, I have shown member 18 provided with the extended ear or lobe portion 18<sup>a</sup>, as an exemplification of the different forms that may be employed, and the uses to which my improved means may be applied. The members 18 and 19 are clamped together by bolts 20 and 21 in a manner similar to that described in connection with Figs. 1 and 2.

In Figs. 4 and 5, a simple and preferred form of ferrule is shown in order to more clearly illustrate this portion or feature of the connection.

It is apparent from the foregoing description and the exemplifications of my invention that a very rigid and firm connection or joint between the respective frame-members may be obtained; and at the same time, a joint is produced which can be easily taken apart when occasion requires. This feature is of great importance especially in connection with the construction of aerial craft where the machines are frequently taken apart to be crated for shipment and later to be reassembled again.

I have illustrated by improved means for forming joints especially for use in connection with tubular frame-members, but it is readily apparent that other forms of tubing or frame-members, whether of wood or metal, of an entirely different shape in cross section, may be secured together by my means; and as many frame-members, as occasion requires, may be made to terminate at the joint, as for example a complete rosette construction of joint may be employed wherein additional member-receiving arms or portions extend or radiate from all sides of the members 10 and 11, so that a greater number of members may be clamped together by the same members.

It will be seen, that with my means, the clamping members or bolts do not pass through the frame-members, but take through the means at points intermediate of the respective frame-members. Furthermore, by providing the two members of the means with the hub or abutting portions to receive the main bolt, and having the auxiliary bolt take through abutting web-portions, it permits the respective members of my joint or connection forming means to be tightly drawn together without a bend or rupture.

I have shown and described several simple forms of my improved means adapted for use in connection with tubular frame-members, but it is apparent that other forms may be employed and that the means may be varied in certain details without departing from the spirit of my invention, and I do not wish to be understood therefore as limiting myself to the precise constructions shown and described, but

What I claim as my invention, and wish to secure by Letters Patent, is:—

1. Means for forming joints, comprising a set of correlated members provided with abutting hub-portions whereby rupturing of said members is prevented, socket-forming portions radiating from the hub-portions, the socket-forming portions being made to conform to the contour of the parts intended to be secured together and provided with flange or rib engaging portions to prevent longitudinal movement of the parts joined together, and means taking through the hub-portions whereby the members are secured together.

2. Means for forming joints, comprising a set of corresponding members provided with radially extending socket-forming portions whose inner faces are provided with means adapted to engage with flanged ends of frame members to prevent longitudinal movement of the frame members, and means for securing the respective members together, said members being provided with abutting surfaces whereby bending of said members is prevented.

3. Means for forming joints, comprising a pair of correlated members provided with corresponding frame-member engaging-portions adapted to engage opposite sides of the frame-members, and intermediate abutting portions whereby collapsing of the members is prevented, a part of the frame-member engaging-portions being formed to provide a channel or socket of relatively smaller dimensions than a part of the incased portion of the frame-members, whereby withdrawal of the frame-members is prevented, and means taking through the intermediate portions whereby the members are clamped together.

4. Means for forming joints, comprising a pair of correlated members having corresponding inner faces to provide two or more sockets conforming to the contour of the frame-members intended to be secured together, and to provide abutting surfaces whereby collapsing of the members is prevented, the inner faces of the socket-forming portion of each member being provided with a flange or rib engaging shoulder to prevent longitudinal movement of the frame members, and means taking through the abutting surfaces for securing the respective members together.

5. Means for forming joints, comprising a set of members provided with semi-circular corresponding portions whereby sockets are formed for the adjacent ends of the frame-members to be secured together, said socket-forming portions being provided with grooves, means adapted to be secured to the ends of the frame-members and to take into said sockets whereby longitudinal movement of the frame-members within the sockets is prevented, and means for clamping the members about the frame-members.

HENRY W. JACOBS.

Witnesses:
FRANK MITCHELL,
DAVID H. OWEN.